UNITED STATES PATENT OFFICE.

EMANUEL G. ZIES, OF BALTIMORE, MARYLAND, ASSIGNOR TO THE STANDARD LIME & STONE COMPANY, OF BALTIMORE, MARYLAND, A CORPORATION OF WEST VIRGINIA.

MANUFACTURE OF MAGNESIA.

1,031,502. Specification of Letters Patent. Patented July 2, 1912.

No Drawing. Application filed January 13, 1912. Serial No. 671,008.

*To all whom it may concern:*

Be it known that I, EMANUEL G. ZIES, of Baltimore, in the State of Maryland, have invented certain new and useful Improvements in Manufacture of Magnesia; and I do hereby declare the following to be a full, clear, and exact description of the invention, such as will enable others skilled in the art to which it appertains to make and use the same.

The primary object of this invention is to provide a simple and efficacious process of chemically separating calcium and magnesium when these elements are present in such combinations as are found in magnesian limestone, dolomite, and crude magnesite.

While the invention is especially applicable to the treatment of dolomite, magnesian limestone or crude magnesite may be treated equally as well as dolomite.

The dolomite is calcined in order to drive off all carbon dioxid. This calcining is preferably carried out in a kiln constructed to permit the removal of the carbon dioxid by means of a pump. This calcined dolomite, consisting of calcium oxid and magnesium oxid, is then ground, preferably fine enough to pass through a thirty (30) mesh screen, but I do not, however, limit myself to this degree of fineness.

A solution of calcium chlorid is brought into intimate mixture with the dry ground calcined dolomite, and the whole is treated in a closed tank with carbon dioxid, preferably that obtained from the kiln in which the dolomite was calcined. The calcium compounds are thereby carbonated while the magnesium is converted directly from the oxid to the chlorid, which being soluble remains in solution and is subsequently separated from the insoluble calcium carbonate by any of the well known methods, such as filtration, decantation or centrifugal force. By this procedure, slaking or recarbonating of the calcined dolomite previous to adding the solution of calcium chlorid and the carbon dioxid, is not necessary; also, by this procedure carbonating of the magnesium oxid does not take place.

When, as has heretofore been proposed, magnesium carbonate is treated with a solution of calcium chlorid, magnesium chlorid is slowly formed as a result of mass action. In order to bring about this reaction a large excess of calcium chlorid, over that required to convert the magnesium oxid into magnesium chlorid, is necessary, and consequently the resulting magnesium chlorid is contaminated with this excess calcium chlorid. According to my method this cannot occur; and if carried out as previously described, and an amount of calcined dolomite containing a quantity of magnesium oxid chemically equivalent to the amount of calcium chlorid, is used, then all of the chlorid in the calcium chlorid is utilized to form magnesium chlorid, the calcium being precipitated as calcium carbonate. The resulting magnesium chlorid can either be used as such or can be precipitated with calcined dolomite, forming magnesium hydroxid and reforming calcium chlorid. This is followed by the separation of the insoluble magnesium compound from the soluble calcium compound. On properly calcining this precipitated magnesium hydroxid, a very dense magnesium oxid is obtained.

I claim as my invention:

1. The herein described method of separating calcium and magnesium in dolomite, or magnesium limestone, or crude magnesite, which consists in calcining the dolomite or its equivalent, bringing the dry calcined material into an intimate mixture with a solution of chlorid of calcium, passing carbon dioxid into this mixture and the subsequent separation of the soluble magnesium chlorid from the insoluble calcium carbonate.

2. The herein described method of separating calcium and magnesium in dolomite, or magnesium limestone, or crude magnesite, which consists in calcining the dolomite or its equivalent, bringing the dry calcined material into an intimate mixture with a solution of calcium chlorid in strength chemically equivalent to the quantity of magnesium oxid in the calcined material, passing carbon dioxid into this mixture and subsequently separating the soluble magnesium chlorid from the insoluble calcium carbonate.

3. The herein described method of separating calcium and magnesium in dolomite, or magnesium limestone, or crude magnesite, which consists in calcining the dolomite or its equivalent, bringing the dry calcined material into an intimate mixture with a solution of chlorid of calcium, passing carbon dioxid into this mixture, then by precipitation with calcined dolomite forming from the magnesium chlorid magnesium hydroxid and reforming calcium chlorid, and then separating all the insoluble magnesium compound from the soluble calcium compound.

In testimony whereof, I have signed this specification in the presence of two subscribing witnesses.

EMANUEL G. ZIES.

Witnesses:
 DANIEL BAKER,
 C. E. DE HOFF.